United States Patent [19]

Morton et al.

[11] 3,760,114

[45] Sept. 18, 1973

[54] FAULT DISCRIMINATION CIRCUIT

[75] Inventors: William Desmond Morton, Rickmansworth; William George Tilston Jones, London, both of England

[73] Assignee: Her Majesty's Postmaster General, London, England

[22] Filed: Mar. 22, 1971

[21] Appl. No.: 126,516

[30] Foreign Application Priority Data

Dec. 11, 1967 Great Britain .................. 56,149/67

[52] U.S. Cl....... 179/18 EB, 179/27 G, 179/175.2 C

[51] Int. Cl. ............................................ H04m 3/12

[58] Field of Search .................... 179/18 EB, 18 EA, 179/18 E, 15 BF, 175.2 R, 22, 27 G, 18 ES, 175.2 C

[56] References Cited

UNITED STATES PATENTS

| | | | |
|---|---|---|---|
| 2,878,327 | 3/1959 | Gohorel | 179/175.2 R |
| 3,385,931 | 5/1968 | Lucas | 179/18 ES |
| 3,492,445 | 1/1970 | Lecoanet | 179/27 G |

*Primary Examiner*—Kathleen H. Claffy
*Assistant Examiner*—David L. Stewart
*Attorney*—Hall & Houghton

[57] ABSTRACT

A fault discrimination circuit for a group of registers of a time division multiplex communication system. Each register of the group has a fault counter for counting faults detected by the register. When a predetermined number of faults is recorded the register is taken out of service. Faults detected by a register are signalled to the fault counters of all other registers in the group and set to zero the fault counters of such other registers provided none has recorded the predetermined number.

4 Claims, 1 Drawing Figure

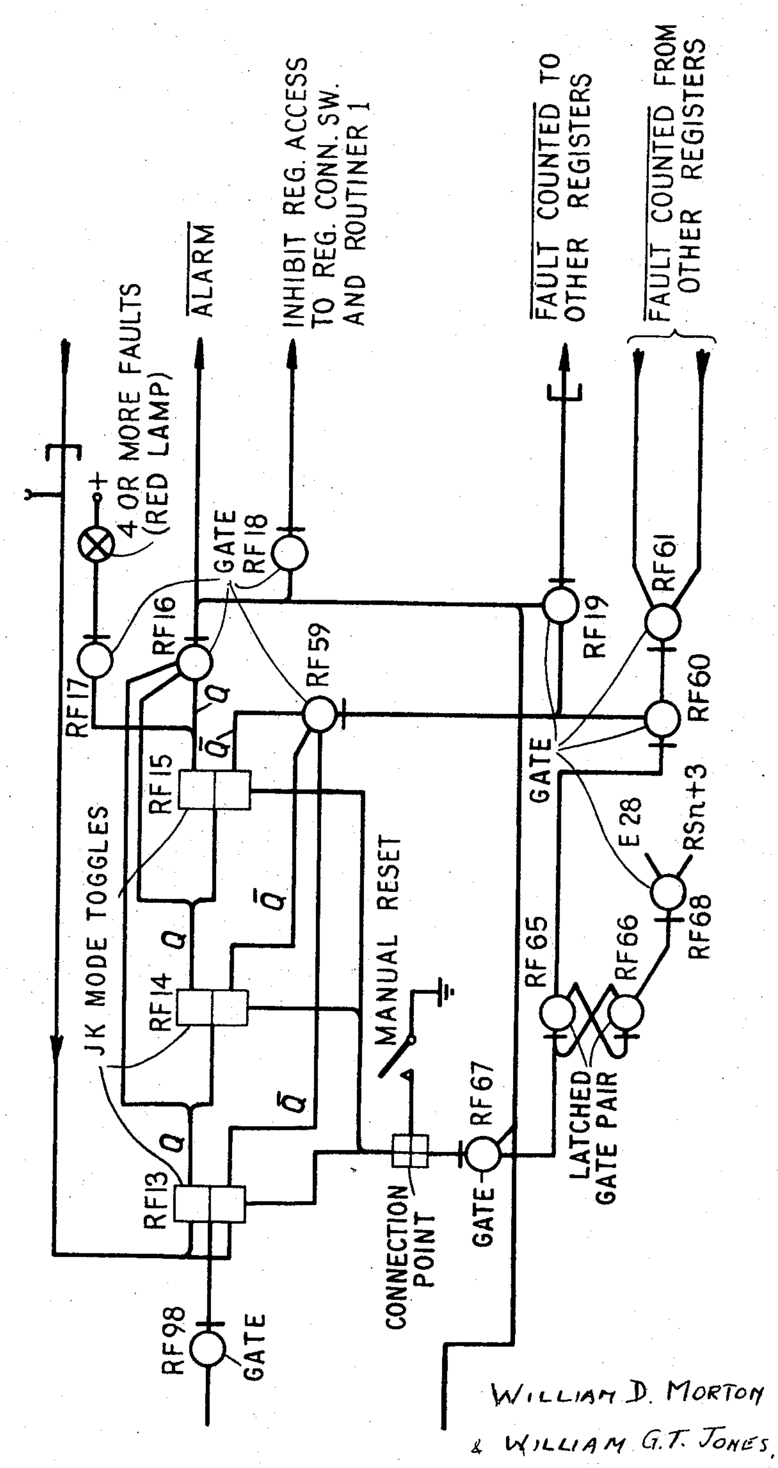
WILLIAM D. MORTON
& WILLIAM G.T. JONES,
INVENTORS.
BY Hall & Houghton
ATTORNEY

FAULT DISCRIMINATION CIRCUIT

BACKGROUND OF THE INVENTION

This invention relates to a discrimination circuit for a time division multiplex (T.D.M.) telecommunication system in which pulse code modulation (P.C.M.) is used. In particular the invention relates to automatic T.D.M. telephone exchange systems employing P.C.M., as described in co-pending Pat. application No. 782,541 by the present applicants and others (now U.S. Pat. No. 3,622,705 issued Nov. 23, 1971) and the content of which is incorporated herein by reference.

Such systems employ REGISTERS for the purposes of accepting and storing dialled, or otherwise communicated, information from the calling circuit when a connection is required to be set-up through the exchange, and for subsequently attempting to set-up the required connection.

REGISTERS are provided as common equipment to be selectively taken into use by calling incoming circuits to the exchange, and are required to be released as soon as it is determined that a connection is, or is not, able to be set up, so as to be available for dealing with other calling circuits.

REGISTERS are therefore vital pieces of equipment in the operation of a telephone exchange and if faulty, will cause considerable trouble, making it very necessary that an early indication of a faulty condition should be indicated in the exchange and measures taken to prevent the offending piece of equipment being available to calling circuits.

If a fault condition arising in an exchange during the setting-up of a connection, is found to involve a REGISTER, the actual reason may be due to a fault in the REGISTER itself, or it may be due to signals external to the REGISTER and coming from other equipment via the interface leads causing the REGISTER to operate incorrectly. If the latter, it is very probable that all of the REGISTERS would be effected.

The object of the invention is to provide REGISTER discrimination circuits able to compare the fault indications given by a group of REGISTERS in an exchange, and make a decision as to whether a faulty condition is as the result of a fault within a particular REGISTER or due to faulty conditions communication from causes external to the REGISTERS.

The circuit is particularly useful where the two types of fault signal cannot be spatially separated, i.e., they may occur on the same lead.

SUMMARY OF THE INVENTION

According to the present invention a time division multiplex communication system having a number of registers comprises, for each register, a fault counter for counting faults detected by the register, means for indicating each detected fault to the fault counter of every other register, means for rendering a register inoperative when the number of faults counted by its fault counter reaches a predetermined value, and, further means for setting the fault counter to zero when a fault indication is received from another register and the fault counter has counted at least one fault but the count has not reached the predetermined value.

There may be provided, for each register, a fault discrimination circuit comprising an $n$-stage binary counter circuit, the input of said counter circuit being connected to the fault indication output of said register, the outputs of the $n$-th stage of said counter circuit being connected to inhibit access to the register.

The output of each stage of the counter circuit is connected to fault discrimination circuits of other registers and to a gate circuit, said gate circuit having a second input connected to the said output of each stage of said counter of each of the other registers, the output of said gate circuit being connected to reset said counter, and in which, if an output is appearing from any stage of the counter as input to the discrimination circuit of each of the other registers at the same time as a signal is received on said second input of said gate circuit, the counter is reset to zero.

There may also be provided a circuit indicating when a register is rendered inoperative.

BRIEF DESCRIPTION OF THE DRAWINGS

The single FIGURE is a logic drawing of the embodiment.

DESCRIPTION OF THE PREFERRED EMBODIMENT

The diagram represents NAND gates to positive logic, and its operation will be described in terms of voltage levels, of two stable states which are used to represent the 0 and 1 conditions of binary logic. The state which results in the more positive output voltage is referred to as HIGH and represented by logical 1, and that which results in the more negative output voltage as LOW and represented by logical 0. Leads on the diagram are labelled in accordance with this nomenclature. For example, a lead labelled ALARM indicates that the named signal occurs when the condition on the lead is HIGH or logical 1 state, while a bar drawn over the designation, such as $\overline{\text{ALARM}}$, indicates that when the condition on the lead is the LOW or 0 state, no alarm signal is given.

There is provided a counter circuit comprising three toggles, RF 13, RF 14 and RF 15, each having an output Q and a complementary output $\overline{Q}$, operating in the JK mode, and with an overriding reset input. Application of a LOW state to this reset lead causes the Q outputs to assume the LOW state regardless of previous or present conditions of the pulse input.

Although the embodiment shows this particular arrangement of counter, the circuit could incorporate any type of toggle capable of being used in a ripple-through binary counter and of being reset to a particular state by a separate input.

If the three toggles RF 13, RF 14 and RF 15 connected as a ripple-through binary counter, are all in the reset condition, their Q outputs will be LOW and their $\overline{Q}$ outputs HIGH, and the output lead $\overline{\text{ALARM}}$ of gate RF 16 will be HIGH, so that no indication will be appearing on this lead.

A first fault indication occurs on input to gate RF 98 and thence to the first toggle RF 13 of the binary counter, resulting in its $\overline{Q}$ output going LOW as input to gate RF 59. The HIGH output of gate RF 59 as input to gate RF 19, causes output of the latter to go LOW and $\overline{\text{FAULT COUNTED}}$ indication to be given to each of the other REGISTERS.

This condition is maintained as further fault signals are received and counted by the counter, provided the total number of faults counted is less than '$n$,' where '$n$' $= 2^r - 1$, '$r$' being the number of stages of the counter, and in this embodiment equal to 3.

If the counter registers a total number of faults equal to '$n$', then the REGISTER is locked-out of service as will be described later.

When anyone of the other REIGSTERS is indicating a fault, a LOW signal is received on a lead FAULT COUNTED FROM OTHER REGISTER connected as input to gate RF 61, whose HIGH output is passed as input to gate RF 60. Gate RF 60 will only give an output if its counter is sending a fault indication on the output of gate RF 19 and at the same time receiving a fault indication from another REGISTER on input to gate RF 61. Under this condition gate RF 60 provides a LOW output to latched-gate pair RF 65 and RF 66, causing a HIGH output from gate RF 65 as input to gate RF 67, whose LOW output resets the counter to zero.

At the same time the counter of the REGISTER which was providing the FAULT COUNTED input to gate RF 61, will be similarly reset to zero.

If a count of '$n$,' in this embodiment equal to 7, is reached without a FAULT COUNTED signal being received from another REGISTER, then each of the Q outputs of the counter will be HIGH as inputs to gate RF 16, whose LOW output on lead ALARM, provides an alarm indication, and as input to gate RF 18, provides a HIGH output on lead INHIBIT, to prevent further access to the REGISTER.

The LOW output of gate RF 16, also provides an inhibition to:

a. prevent any further fault indications being received via gate RF 98 and counted, b. gate RF 19, to stop sending the FAULT COUNTED signal to other REGISTERS and c. gate RF 67, to prevent the counter being reset from gate RF 60.

The counter is thus locked-out, and prevented from being reset from another register or from providing a reset for any other REGISTER. This is necessary if more than one REGISTER is to be locked-out at a time.

A locked-out REGISTER is reset by a manual operation. Also the counter can be reset by a pulse with a repetition rate low compared to the calling rate. This is provided in addition to the manual operation to cater for conditions when there is only a small number of REGISTERS and the traffic density is low, particularly at times when the exchange is unattended such as at night. Under these conditions it is very probable that all incoming calls may obtain access to the same REGISTER.

Should faulty conditions prevail in the setting up of connections it is possible for the REGISTER to be locked-out, as already described, not only by faults within itself, but by faults communicated to it from the interface leads.

A reset pulse is therefore used to put the REGISTER back into service, on the basis of giving it the benefit of the doubt.

A further input to gate RF 13, the first stage of the counter, is provided by a lead INHIBIT, used to stop the counting of fault signals when the REGISTER is being tested by a routiner. Without this, signal access to the REGISTER could be inhibited when no fault existed if the routiner were providing signals to the REGISTER indicative of an external fault.

The fault signals in the REGISTER may arise due to internal or external conditions, some of the internal faults being such that a single fault signal would probably not affect the operation of the REGISTER. It would be undesirable to inhibit access to the REGISTER on such a single fault, but if the fault signals persisted this would indicate that the REGISTER could not operate, and should be locked-out. In the circuits described, with '$r$' stages in the binary counter, $n = 2^r - 1$ is the number of fault signals indicating that access to the REGISTER should be inhibited.

This number can be made large for equipment which is tolerant of isolated faults, or small for fault sensitive equipment.

The number of stages in the counter is also determined by the number of REGISTERS operating, and the way in which calls are distributed among them. With random access to the REGISTERS, if '$n$' is the count for lock-out, and '$p$' the number of fault signals generated by each incorrect call, it could take only $n/p$ calls to lock-out and inhibit access to a correctly working REGISTER, $n/p$ being rounded up to the nearest whole number. The chances of this happening with '$m$' REGISTERS in operation are 1 in $m^{n/p}$. The possibility of inhibited access to a particular REGISTER is increased to 1 in $(m-x)^{n/p}$ if access to '$x$' REGISTERS is already inhibited, since the FAULT COUNTED signal is not provided by a locked-out counter.

With sequential access to the '$m$' REGISTERS, they cannot be locked-out by interface signals, provided that every call is incorrect and produces less than '$n$' fault signals per REGISTER (i.e., $p < n$). If 1 in '$y$' calls produce '$p$' fault signals in each of the $(m-x)$ correctly working REGISTERS to which access is available, a REGISTER can only be locked-out if $(m-x) = y$. This will occur after $(x) \cdot n/p$ calls have been sequentially distributed among the available REGISTERS. Since '$x$' is then increased by one, no further REGISTERS can be locked-out if '$y$' remains constant.

The count required to inhibit access is thus decided by consideration of the fault sensitivity of the equipment, the number of similar equipments used, the method of access to these equipments, and the desirability of an equipment becoming locked-out due to interface signals and not to faults within the equipment.

An indication that a REGISTER has reached a certain fault count approaching the condition of lock-out is given for the benefit of the exchange maintenance staff. In the diagram of the embodiment described, this is shown as a red lamp on the output of gate RF 17 connected to the third stage of the binary counter, the lamp therefore indicating in this case when four or more faults have been counted.

Operation of the lamp would be suitably arranged for other counters having different numbers of stages, i.e., different values of '$n$.'

We claim:

1. A time division multiplex communication system having a number of registers and comprising, for each register, a fault counter for counting faults detected by the register, means for indicating each detected fault to the fault counter of every other register, means for rendering a register inoperative when the number of faults counted by its fault counter reaches a predetermined value, and, further means for setting the fault counter to zero when a fault indication is received from another register and the fault counter has counted at least one fault but the count has not reached the predetermined value.

2. A time division multiplex communication system as claimed in claim 1 in which the fault counter comprises an n-stage binary counter having an input, there being a fault indication lead interconnecting said input and said register, and an interconnection from the nth stage of the counter to the register for rendering the latter inoperative, n being the predetermined value.

3. A time division multiplex communication system as claimed in claim 2 in which the output of each stage of the counter is connected to the fault discrimination circuit of each other register and to a gate circuit, the gate circuit also having a second input connected to the output of each stage of the counter of each other register, the gate circuit having an output connected to reset the counter, the arrangement being such that, in the event of an output appearing from any stage of the counter at the same time as the second gate input is stimulated, the counter is reset to zero.

4. A time division multiplex communication system as claimed in claim 1 and further comprising an indicating circuit responsive to said means for rendering a register inoperative for indicating when a register is rendered inoperative.

* * * * *